United States Patent [19]

Jaxmar et al.

[11] Patent Number: 4,480,535
[45] Date of Patent: Nov. 6, 1984

[54] APPARATUS FOR AIR-TREATMENT OF PRODUCTS

[75] Inventors: Leif Jaxmar, Vallåkra; Allan Alfred, Helsingborg, both of Sweden

[73] Assignee: Frigoscandia Contracting AB, Sweden

[21] Appl. No.: 501,910

[22] Filed: Jun. 7, 1983

[30] Foreign Application Priority Data

Jun. 22, 1982 [SE] Sweden ............................ 8203873

[51] Int. Cl.³ .............................................. A23B 4/06
[52] U.S. Cl. ...................................... 99/476; 34/147; 62/381; 99/478; 99/483; 99/517
[58] Field of Search ................... 99/467, 470, 473–476, 99/477–479, 483, 516, 517; 34/147; 62/381, 63; 198/339, 610, 778, 844

[56] References Cited

U.S. PATENT DOCUMENTS 3,348,659 10/1967 Roinestad ......................... 34/147 X Primary Examiner—Timothy F. Simone
Attorney, Agent, or Firm—Shapiro and Shapiro

[57] ABSTRACT

An apparatus for air-treatment of products includes an endless foraminous conveyor belt for the products which is adapted within the space for the air-treatment to follow at least one path extending helically in several turns, said path for the foraminous conveyor belt being defined by an inner cylinder and an outer cylinder and the air being disposed to flow through the passage situated between the cylinders from one end to the other end of the passage. According to the invention the air is also disposed to be supplied to the passage between the cylinders from the inner cylinder through perforations therein, the size of the perforations and/or the interspace therebetween being so chosen that the air supply from the inner cylinder continuously varies in the longitudinal direction thereof.

2 Claims, 1 Drawing Figure

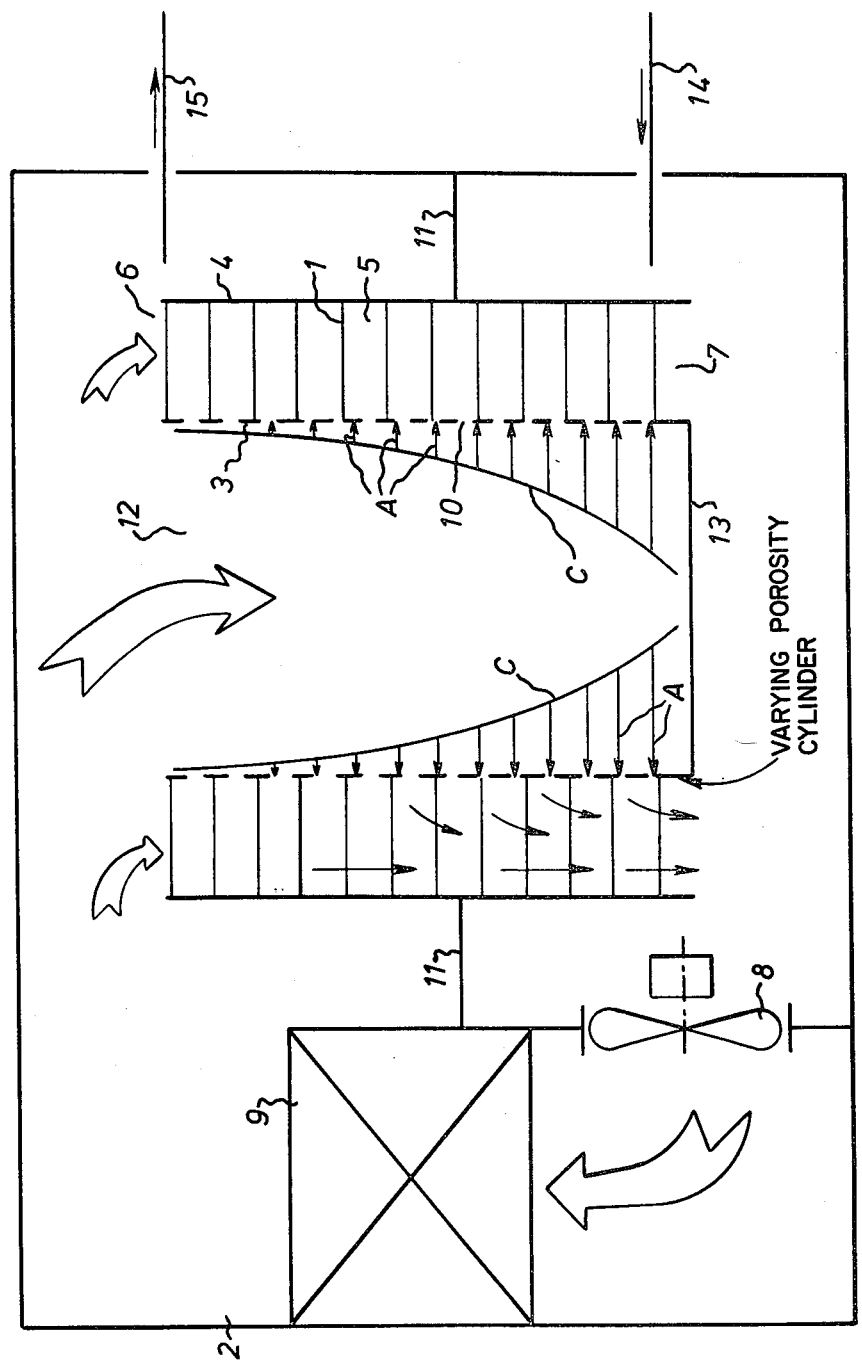

APPARATUS FOR AIR-TREATMENT OF PRODUCTS

The present invention relates to an apparatus for air-treatment of various products such as foodstuffs, including an endless foraminous conveyor belt for the products which is adapted within the space for the air treatment to follow at least one path extending helically in several turns, said helically extending path for the foraminous conveyor belt being defined by an inner and an outer cylinder, and the air being disposed to flow through the passage situated between the cylinders, from one end to the other end of said passage. Characteristic of the apparatus is that the air is disposed also to be supplied to the passage between the cylinders from the inner cylinder through perforations therein, the size of the perforations and/or the interspace therebetween being so chosen that the air supply from the inner cylinder continuously varies in the longitudinal direction thereof.

The invention is based on the fact that, during freezing and also cooling of a product in a cold air stream, more heat can be carried away from the product at the beginning of the freezing cycle than at the end. To fully utilize this fact a larger amount of air should consequently pass over the product in the first stage of the freezing cycle, and decrease successively as the heat emission from the product diminishes. This will thus give an optimum solution as to the quality of the frozen product as well as the capacity and energy consumption of the refrigerating equipment.

The invention will be described in more detail below with reference to the accompanying drawing which in cross-section shows an embodiment, chosen by way of example, of the apparatus according to the invention.

The apparatus consists of a freezing plant for foodstuffs and like products, including an endless foraminous conveyor belt 1 for the products. The conveyor belt 1 is so constructed that it can travel in a curve in its own plane, which has made it possible to give the apparatus a compact design. Thus the conveyor belt 1 is so adapted in the cooling chamber proper 2, the walls of which should be insulated, that it will follow at least one path extending helically in several turns, said helically extending path for the foraminous conveyor belt 1 being defined by an inner cylinder 3 and outer cylinder 4. The cylinder 3 is suitably arranged so as to rotate, and it is preferably driven so that it constitutes or is an integral part of the driving means of the conveyor belt 1.

The air is disposed to flow through the passage 5 situated between the cylinders 3 and 4, from one end 6 to the other end 7 of said passage. The air or gas is disposed to be driven by the fan 8 situated in the cooling chamber 2 and disposed to pass the cooling-coil battery 9.

According to the present invention the air is not only disposed to flow through the passage 5 between the ends 6 and 7 but it is also disposed to be supplied to the passage 5 from the inner cylinder 3 through perforations 10 therein, the size of the perforations 10 and/or the interspace therebetween being so chosen that the porosity of the inner cylinder 3, and hence the air supply fron the inner cylinder 3, varies continuously in the longitudinal thereof as indicated by curve C and arrows A.

The cooling chamber 2 is provided with baffles 11 whereby the air coming from the cooling-coil battery 9 will be forced, on one hand, to flow directly down through the passage 5 the cross-section of which is covered by the foraminous helically extending conveyor belt 1 and, on the other hand, via the perforations 10 of the inner cylinder 3, to flow radially into the passage 5. A condition therefor is that both the end 6 of the passage 5 and the end 12 of the inner cylinder 3 facing the air source 8 as counted in the flow direction are open.

When the air is to flow straight through the passage 5 also the end 7 of the passage 5 facing away from the fan 8 is open. When, on the contrary, the air in the inner cylinder 3 is to be forced out through the perforations 10, the end 13 of the inner cylinder 3 facing away from the fan 8 must be more or less closed.

As is apparent from the drawing the size of the perforations 10 and/or the interspace therebetween in the inner cylinder 3 are so chosen that the air supply from the inner cylinder 3 increases continuously in the direction of that end 7 of the passage 5 at which the products are disposed to be fed into the helically extending path section. The feed section of the conveyor belt 1 is designated 14 while the discharge section is designated 15. Thus the apparatus operates according to the counter-current principle, which means that the air is disposed to flow from the top downwards while the product is to be moved from the bottom upwards by the conveyor belt 1.

It would be possible to replace the inner cylinder 3 by a cylinder being provided with perforations 10 arranged otherwise so that the continuous variation of the air supply wil follow another curve than that shown in the drawing. The change of the air supply can also be effected by making the size of the perforations adjustable.

According to the drawing the feeding takes place at the bottom of the helically extending path but the principle for this invention is of course also applicable to a top-feed freezer.

The invention is not restricted to that described above and shown in the drawing but may be modified within the scope of the appended claims.

What we claim and desire to secure by Letters Patent is:

1. Apparatus for air-treatment of various products, such as foodstuffs, comprising a chamber having supported therein inner and outer spaced cylinders defining an air flow passage therebetween extending from one end of the cylinders to an opposite end of the cylinders, an endless foraminous conveyor belt for the products supported along a helical path in said passage such that air entering said passage at said one end of the cylinders and exiting said passage at said opposite end of the cylinders passes through successive turns of the conveyor belt, said inner cylinder being perforated and having an opening at one end for the entry of air to said inner cylinder, the opposite end of said inner cylinder being sufficiently closed to cause the lastmentioned air to exit from said inner cylinder through the perforations thereof, into said passage, and out of said opposite end of the outer cylinder, and means for causing air to enter said passage and said inner cylinder at said one end and to exit from said passage at said opposite end, the porosity of said inner cylinder varying along the length thereof whereby the airflow through said inner cylinder is controlled.

2. An apparatus as claimed in claim 1, wherein the porosity of the inner cylinder increases continuously in the direction of said opposite end of said cylinders, and wherein said conveyor belt includes a feed section adjacent to said opposite end and a discharge section adjacent to said one end.

* * * * *